US011960280B2

(12) United States Patent
Matsunaga (10) Patent No.: US 11,960,280 B2
(45) Date of Patent: Apr. 16, 2024

(54) DISPLAY CONTROL DEVICE AND DISPLAY CONTROL METHOD (71) Applicant: HONDA MOTOR CO., LTD., Tokyo (JP)

(72) Inventor: Hideki Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 345 days.

(21) Appl. No.: 17/477,803

(22) Filed: Sep. 17, 2021

(65) Prior Publication Data

US 2022/0004187 A1 Jan. 6, 2022

Related U.S. Application Data (63) Continuation of application No. PCT/JP2019/014308, filed on Mar. 29, 2019.

(51) Int. Cl.
*G05D 1/00* (2024.01)
*G05D 1/02* (2020.01)

(52) U.S. Cl.
CPC ......... *G05D 1/0022* (2013.01); *G05D 1/0027* (2013.01); *G05D 1/0044* (2013.01); *G05D 1/0287* (2013.01)

(58) Field of Classification Search
CPC ........ B60K 2370/167; B60K 2370/176; B60K 2370/178; B60K 2370/55; B60K 2370/589; B60K 35/00; B60W 2050/146; B60W 50/04; G05D 1/0022; G05D 1/0027; G05D 1/0044; G05D 1/0287; G05D 2201/0213; G08G 1/01; G08G 1/09; H04B 17/00
See application file for complete search history.

(56) References Cited

U.S. PATENT DOCUMENTS

| 10,620,635 | B2* | 4/2020 | Yunoki | ............. B60W 60/0059 |
| 2014/0058613 | A1* | 2/2014 | Leinfelder | ............ B60W 30/06 701/28 |
| 2018/0231982 | A1* | 8/2018 | Yunoki | ................ G05D 1/0217 |
| 2019/0092345 | A1 | 3/2019 | Zhu | |

FOREIGN PATENT DOCUMENTS

| CN | 107589745 A | 1/2018 |
| JP | H09-244745 A | 9/1997 |
| JP | 2012-147500 A | 8/2012 |
| JP | 2015-190945 A | 11/2015 |
| JP | 2018-056936 A | 4/2018 |
| JP | 2018-180771 A | 11/2018 |
| WO | 2016/121254 A1 | 8/2016 |
| WO | 2020/202379 A1 | 10/2020 |

OTHER PUBLICATIONS

International Search Report and Written Opinion for PCT/JP2019/014308 dated Jun. 18, 2019.
Chinese Office Action issued for Chinese Patent Application No. 201980094107.8 dated Jul. 22, 2022 (with Partial Translation).
Japanese Office Action issued for Japanese Patent Application No. 2021-511753 dated Apr. 10, 2023 (with Partial Translation).

* cited by examiner

Primary Examiner — Tyler J Lee
(74) Attorney, Agent, or Firm — Thomas| Horstemeyer, LLP (57) ABSTRACT A display control device includes an acquisition unit for acquiring a communication state of each of a plurality of communication devices, and a control unit for displaying the communication state of each of the plurality of communication devices in association with each communication device.

11 Claims, 7 Drawing Sheets

DISPLAY CONTROL DEVICE AND DISPLAY CONTROL METHOD

CROSS-REFERENCE TO RELATED APPLICATION(S)

This application is a continuation of International Patent Application No. PCT/JP2019/014308 filed on Mar. 29, 2019, the entire disclosures of which is incorporated herein by reference.

BACKGROUND OF THE INVENTION

Field of the Invention

The present disclosure relates to a display control device and a display control method.

Description of the Related Art

In a mobile terminal having a wireless communication function, high-speed data transfer may become difficult or wireless communication itself may become impossible depending on a communication environment. A communication device described in Japanese Patent Laid-Open No. 2012-147500 displays a communication quality value of the communication device to a user. The purpose thereof is to avoid unnecessary processing due to insufficient communication quality.

SUMMARY OF THE INVENTION

In the technology described in Japanese Patent Laid-Open No. 2012-147500, only the user of the communication device can grasp a communication state of the communication device. However, the communication state is also useful for a person other than the user. Some aspects of the present disclosure provide a technology for enabling a person other than a user of a communication device to grasp a communication state of the communication device.

In an embodiment, provided is a display control device including: an acquisition unit for acquiring a communication state of each of a plurality of communication devices; and a control unit for displaying the communication state of each of the plurality of communication devices in association with each communication device.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Figure 1:
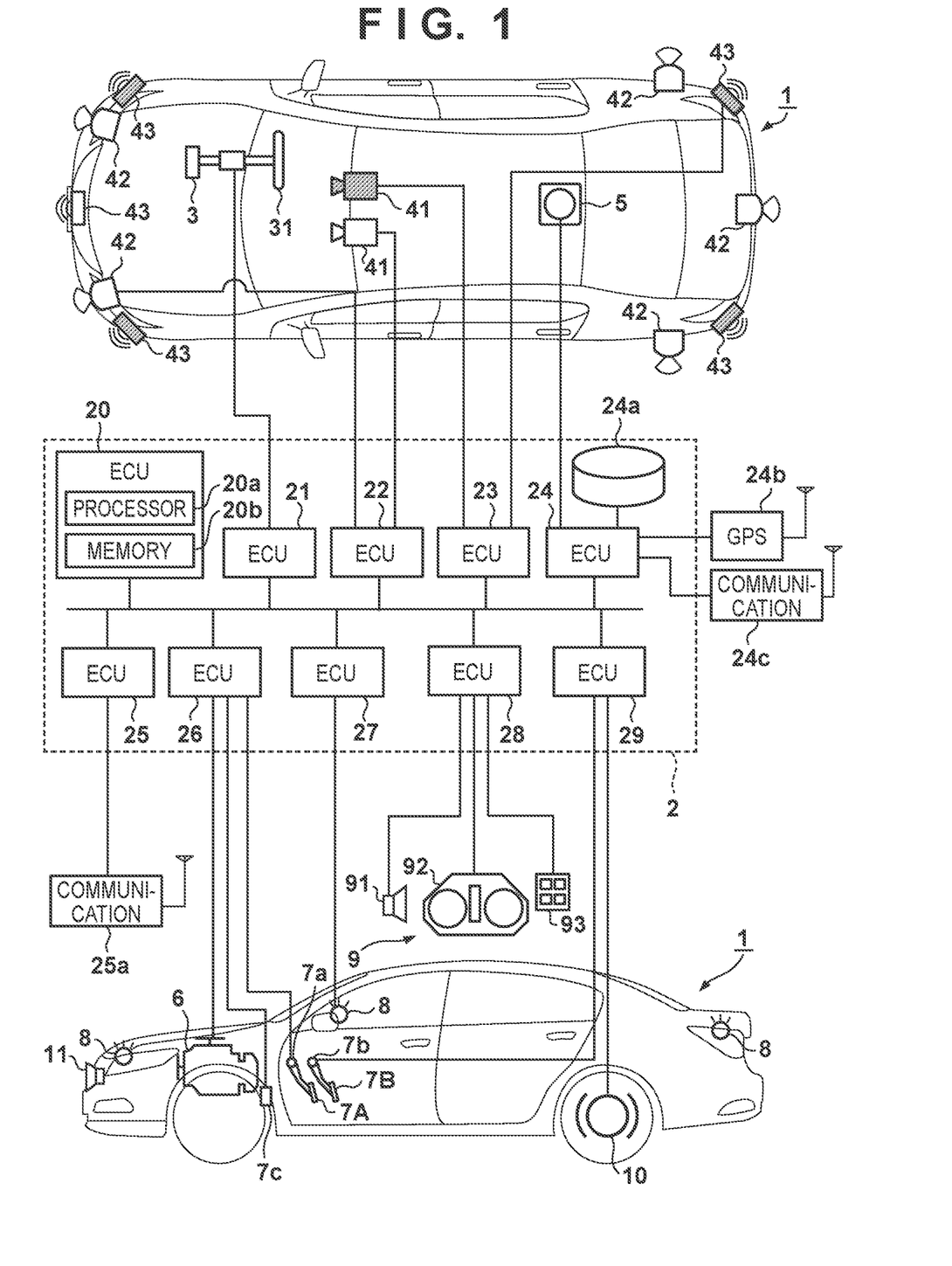
FIG. 1 is a block diagram for describing an example of a configuration of a vehicle according to an embodiment.

A vehicle 1 includes a vehicle control device 2 (hereinafter, simply referred to as a control device 2) that controls the vehicle 1. The control device 2 includes a plurality of electronic control units (ECUs) 20 to 29 communicably connected by an in-vehicle network. Each ECU includes a processor represented by a central processing unit (CPU), a memory such as a semiconductor memory, an interface with an external device, and the like. The memory stores programs executed by the processor, data used for processing by the processor, and the like. Each ECU may include a plurality of processors, memories, interfaces, and the like. For example, the ECU 20 includes a processor 20a and a memory 20b. Processing by the ECU 20 is executed by the processor 20a executing a command included in the program stored in the memory 20b. Alternatively, the ECU 20 may include a dedicated integrated circuit such as an application-specific integrated circuit (ASIC) for executing processing by the ECU 20. The same applies to other ECUs.

Hereinafter, functions and the like assigned to each of the ECUs 20 to 29 will be described. Note that the number of ECUs and the functions assigned to the ECUs can be designed as appropriate and can be subdivided or integrated as compared with the present embodiment.

The ECU 20 performs a traveling control related to an automated driving function and a remote driving function of the vehicle 1. In the traveling control, the ECU 20 automatically controls steering and/or acceleration/deceleration of the vehicle 1. The automated driving function is a function in which the ECU 20 plans a travel route of the vehicle 1 and controls steering and/or acceleration/deceleration of the vehicle 1 based on the travel route. The remote driving function is a function in which the ECU 20 controls steering and/or acceleration/deceleration of the vehicle 1 in accordance with an instruction from an operator outside the vehicle 1. The operator outside the vehicle 1 may be a person or artificial intelligence (AI). The ECU 20 can also execute the automated driving function and the remote driving function in combination. For example, the ECU 20 may perform the traveling control by planning the travel route while there is no instruction from the operator, and when there is an instruction from the operator, the ECU 20 may perform the traveling control according to the instruction.

The ECU 21 controls an electric power steering device 3. The electric power steering device 3 includes a mechanism that steers a front wheel according to a driver's driving operation (steering operation) on a steering wheel 31. In addition, the electric power steering device 3 includes a motor that exerts a driving force for assisting the steering operation and automatically steering the front wheel, a sensor that detects a steering angle, and the like. When a driving state of the vehicle 1 is an automated driving state, the ECU 21 automatically controls the electric power steering device 3 according to an instruction from the ECU 20 and controls a traveling direction of the vehicle 1.

The ECUs 22 and 23 control detection units 41 to 43 that detect a situation outside the vehicle and execute information processing on a detection result. The detection unit 41 is a camera that captures an image of the front of the vehicle 1 (hereinafter, referred to as a camera 41) and is attached to the vehicle interior side of the windshield at the front of the roof of the vehicle 1 in the present embodiment. By analyzing the image captured by the camera 41, it is possible to extract a contour of an object or extract a division line (white line or the like) of a lane on a road.

The detection unit 42 is a light detection and ranging (lidar) (hereinafter, it may be referred to as a lidar 42), detects an object around the vehicle 1, and measures a distance to the object. In the present embodiment, five lidars 42 are provided, one at each corner portion of a front portion of the vehicle 1, one at the center of a rear portion of the vehicle 1, and one at each side of the rear portion of the vehicle 1. The detection unit 43 is a millimeter-wave radar (hereinafter, it may be referred to as a radar 43), detects an object around the vehicle 1, and measures a distance to the object. In the present embodiment, five radars 43 are provided, one at the center of the front portion of the vehicle 1, one at each corner portion of the front portion of the vehicle 1, and one at each corner portion of the rear portion of the vehicle 1.

The ECU 22 controls one camera 41 and each lidar 42 and executes information processing on the detection result. The ECU 23 controls the other camera 41 and each radar 43 and executes information processing on the detection result. Since two sets of devices for detecting the surrounding situation of the vehicle are provided, the reliability of the detection result can be improved, and since different types of detection units such as a camera, a lidar, and a radar are provided, the surrounding environment of the vehicle can be analyzed in multiple ways.

The ECU 24 controls a gyro sensor 5, a global positioning system (GPS) sensor 24b, and a communication device 24c and executes information processing on a detection result or a communication result. The gyro sensor 5 detects a rotational motion of the vehicle 1. The course of the vehicle 1 can be determined based on the detection result of the gyro sensor 5, the wheel speed, and the like. The GPS sensor 24b detects the current position of the vehicle 1. The communication device 24c performs wireless communication with a server that provides map information and traffic information and acquires these pieces of information. The ECU 24 can access a map information database 24a constructed in the memory, and the ECU 24 searches for a route from the current position to a destination and the like. The ECU 24, the map database 24a, and the GPS sensor 24b constitute a so-called navigation device.

The ECU 25 includes a communication device 25a for vehicle-to-vehicle communication. The communication device 25a performs wireless communication with other surrounding vehicles to exchange information between the vehicles. The communication device 25a is also used for communication with an operator outside the vehicle 1.

The ECU 26 controls a power plant 6. The power plant 6 is a mechanism that outputs a driving force for rotating driving wheels of the vehicle 1 and includes, for example, an engine and a transmission. For example, the ECU 26 controls the output of the engine according to the driving operation (accelerator operation or acceleration operation) of the driver detected by an operation detection sensor 7a provided on an accelerator pedal 7A and switches the gear ratio of the transmission based on information such as a vehicle speed detected by a vehicle speed sensor 7c. When the driving state of the vehicle 1 is the automated driving state, the ECU 26 automatically controls the power plant 6 according to an instruction from the ECU 20 and controls the acceleration and deceleration of the vehicle 1.

The ECU 27 controls lighting devices 8 (lamps such as headlight and taillight) including direction indicators (directional signals). In the example of FIG. 1, the lighting devices 8 are provided at the front portion, door mirrors, and the rear portion of the vehicle 1. The ECU 27 further controls a sound device 11 facing the outside of the vehicle, including a horn. The lighting device 8, the sound device 11, or a combination thereof has a function of providing information to the outside of the vehicle 1.

The ECU 28 controls an input/output device 9. The input/output device 9 outputs information to the driver and receives an input of information from the driver. A sound output device 91 notifies the driver of information by sound. A display device 92 notifies the driver of information by displaying an image. The display device 92 is arranged, for example, in front of a driver's seat and constitutes an instrument panel or the like. Note that, although the sound and the image display have been exemplified here, information notification may also be made by using vibration or light. In addition, information notification may be made by using a combination of some of the sound, image display, vibration, and light. Furthermore, the combination or the notification mode may vary in accordance with the level (for example, the degree of urgency) of information notification of which should be made. An input device 93 is a switch group that is arranged at a position where the driver can operate it and is used to input an instruction to the vehicle 1. The input device 93 may also include a sound input device. The ECU 28 can perform guidance related to the traveling control of the ECU 20. Details of the guidance will be described later. The input device 93 may include a switch used to control an operation of the traveling control performed by the ECU 20. The input device 93 may include a camera for detecting a line-of-sight direction of the driver.

The ECU 29 controls a brake device 10 and a parking brake (not illustrated). The brake device 10 is, for example, a disc brake device, and is provided on each wheel of the vehicle 1 to decelerate or stop the vehicle 1 by applying resistance to the rotation of the wheel. The ECU 29 controls the operation of the brake device 10 according to the driver's driving operation (brake operation) detected by an operation detection sensor 7b provided on a brake pedal 7B, for example. When the driving state of the vehicle 1 is the automated driving state, the ECU 29 automatically controls the brake device 10 according to an instruction from the ECU 20 and controls the deceleration and stop of the vehicle 1. The brake device 10 and the parking brake can also be operated to maintain a stopped state of the vehicle 1. In addition, in a case where the transmission of the power plant 6 includes a parking lock mechanism, the parking lock mechanism can also be operated to maintain the stopped state of the vehicle 1.

A configuration of a remote driving device 200 according to some embodiments of the present disclosure will be described with reference to a block diagram of FIG. 2. The remote driving device 200 is a device for providing a remote driving service to a vehicle having the remote driving function. The remote driving device 200 is located away from the service providing target vehicle.

The remote driving device 200 may be capable of providing the remote driving service in a plurality of operation modes. The plurality of operation modes of the remote driving service may include a leading mode and an assisting mode. The leading mode is an operation mode in which the operator of the remote driving device 200 specifies a control amount (for example, a steering angle, an accelerator pedal position, a brake pedal position, a position of a directional signal lever, or on/off of a light) of the vehicle. The assisting mode is an operation mode in which the vehicle (specifically, the ECU 20) determines a control amount of the vehicle in accordance with a path plan specified by the operator of the remote driving device 200. In the assisting mode, the operator of the remote driving device 200 may generate and specify the path plan by himself/herself, or may specify the path plan by adopting a path plan suggested by the vehicle.

Figure 2:
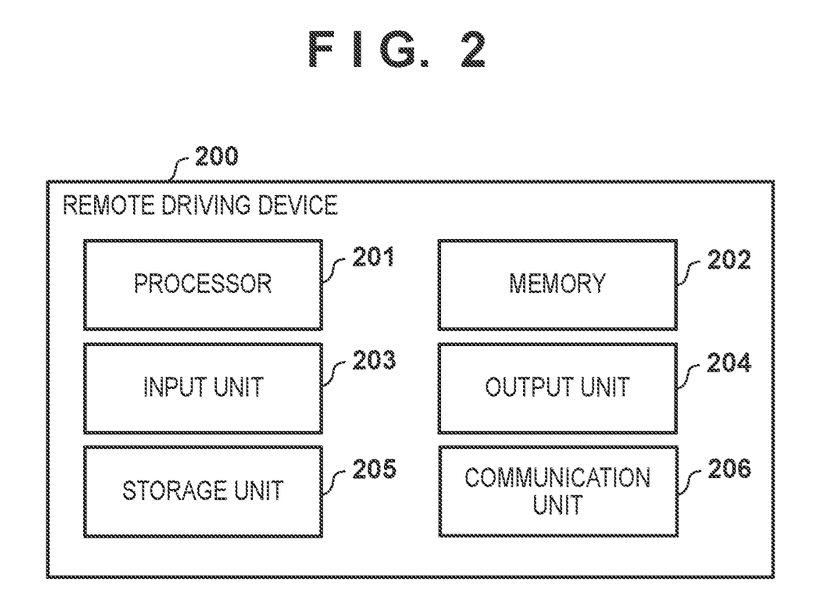
FIG. 2 is a block diagram for describing an example of a configuration of a remote driving device according to the embodiment.

The remote driving device 200 includes each component illustrated in FIG. 2. A processor 201 controls the overall operation of the remote driving device 200. The processor 201 functions as, for example, a CPU. A memory 202 stores programs, temporary data, and the like used for the operation of the remote driving device 200. The memory 202 is implemented by, for example, a ROM or a RAM. An input unit 203 is used by a user of the remote driving device 200 to make an input to the remote driving device 200. The user of the remote driving device 200 is a person who is an operation subject, or is a person (observer) who monitors an operation of AI in a case where the AI is the operation subject. An output unit 204 is used to output information from the remote driving device 200 to the user. A storage unit 205 stores data used for the operation of the remote driving device 200. The storage unit 205 is implemented by a storage device such as a disk drive (for example, HDD or SSD). A communication unit 206 provides a function for the remote driving device 200 to communicate with other devices (for example, a vehicle to be remotely driven), and is implemented by, for example, a network card, an antenna, or the like.

Figure 3:
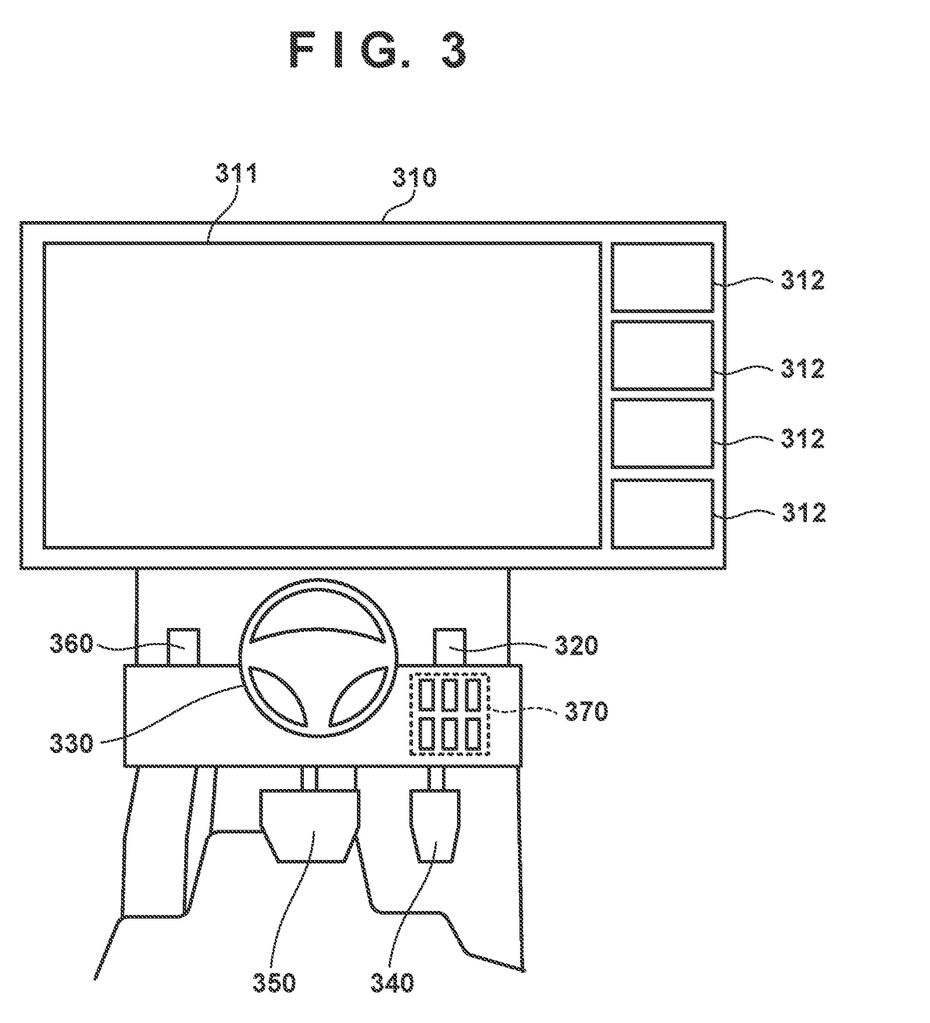
FIG. 3 is a schematic diagram for describing an example of a console for remote driving according to the embodiment.

An example of a configuration of the input unit 203 and the output unit 204 of the remote driving device 200 will be described with reference to the schematic diagram of FIG. 3. In this configuration example, the output unit 204 is implemented by a display device 310 and a sound device 320, and the input unit 203 is implemented by a steering wheel 330, an accelerator pedal 340, a brake pedal 350, a microphone 360, and a plurality of switches 370.

The display device 310 is a device that outputs visual information for providing the remote driving service. The sound device 320 is a device that outputs auditory information for providing the remote driving service. A screen displayed on the display device 310 includes one main region 311 and a plurality of sub regions 312. In the main region 311, information regarding a control target vehicle among a plurality of vehicles to which the remote driving service is provided is displayed. The control target vehicle is a vehicle to which an instruction from the remote driving device 200 is transmitted. In each sub region 312, information regarding a vehicle other than the control target vehicle among the plurality of vehicles to which the remote driving service is provided is displayed. The vehicle other than the control target vehicle may be referred to as a monitoring target vehicle. In a case where the remote driving service is provided to a plurality of vehicles by one remote driving device 200, the operator appropriately switches the vehicle (that is, the control target vehicle) displayed in the main region 311. The information displayed in the main region 311 and the sub region 312 includes a traffic condition around the vehicle, the speed of the vehicle, and the like.

The steering wheel 330 is used to control the steering amount of the control target vehicle in the leading mode. The accelerator pedal 340 is used to control the accelerator pedal position of the control target vehicle in the leading mode. The brake pedal 350 is used to control the brake pedal position of the control target vehicle in the leading mode. The microphone 360 is used to input voice information. The voice information input to the microphone 360 may be transmitted to the control target vehicle and reproduced in the vehicle.

The plurality of switches 370 are used to perform various inputs for providing the remote driving service. For example, the plurality of switches 370 include a switch for switching the control target vehicle, a switch for instructing a determination result of the operator in the assisting mode, a switch for switching a plurality of operation modes, and the like.

The remote driving device 200 described with reference to FIGS. 2 and 3 can provide both the leading mode and the assisting mode. Alternatively, the remote driving device 200 may be capable of providing only one of the leading mode and the support mode. In a case where the leading mode is not provided, the steering wheel 330, the accelerator pedal 340, and the brake pedal 350 can be omitted. In addition, a plurality of remote driving devices 200 may cooperate to provide the remote driving service. In this case, the remote driving device 200 may be able to hand over the vehicle to which the service is provided to another remote driving device 200.

Figure 4:
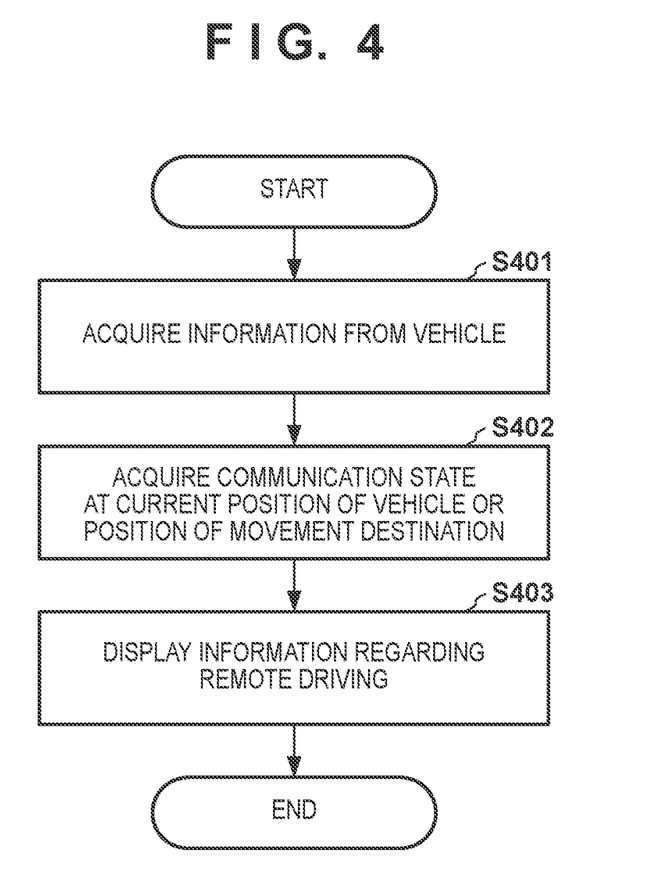
FIG. 4 is a flowchart for describing an example of a display control method according to the embodiment.

A display control method executed by the remote driving device 200 will be described with reference to FIG. 4. In this control method, the remote driving device 200 functions as a display control device. This control method may be executed by a processor of the remote driving device 200 executing a program stored in a memory. Alternatively, some or all of the steps of the method may be executed by a dedicated circuit such as an application-specific integrated circuit (ASIC). In the former case, the processor is a component for a specific operation, and in the latter case, the dedicated circuit is a component for a specific operation. The control method of FIG. 4 is repeatedly executed while the remote driving device 200 is providing the remote driving service.

In step S401, the remote driving device 200 acquires information to be used for providing the remote driving service from each of a plurality of service target vehicles 1. For example, this information is acquired by receiving information transmitted from the vehicle 1 via the communication network. This information may include information regarding the vehicle 1, for example, a current position, a communication state, a current speed, a surrounding traffic situation, a difficulty level of the automated traveling control, a planned movement route, and the like. The communication state of the vehicle 1 may include, for example, current communication quality (for example, a communication delay), a communication standard (3G, 4G, 5G, or the like) of a communication network being connected, and the like.

In step S402, the remote driving device 200 acquires information to be used for providing the remote driving service from a vehicle other than the plurality of service target vehicles 1. This information includes, for example, communication quality at each point, map information, and the like. This information may be acquired by being received from an external device that provides the information, or may be acquired by reading information stored in advance in the memory 202 of the remote driving device 200.

In step S403, the remote driving device 200 displays information to be used by the operator to provide the remote driving service on the display device as the output unit 204. The displayed information includes the information acquired in steps S401 and S402 and/or information derived from the information.

Figure 5:
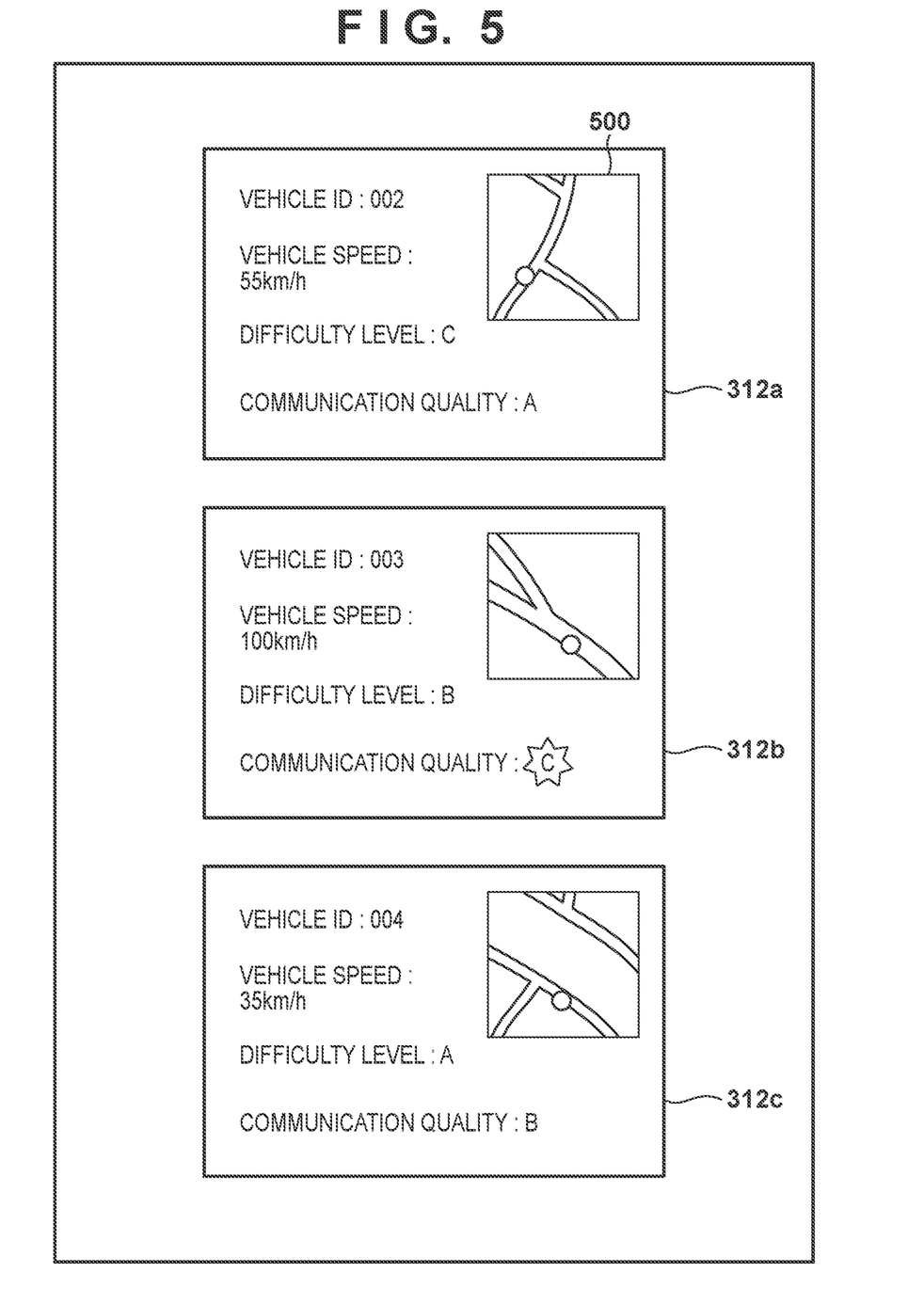
FIG. 5 is a schematic diagram for describing a display example according to the embodiment.

An example of the information displayed in step S403 will be described with reference to FIG. 5. As described above, the information regarding the vehicle to which the remote driving service is provided is displayed in the plurality of sub regions 312. As described above, the plurality of sub regions 312 are included in a display device 310 for visual recognition by the user of the remote driving device 200 that provides the remote driving service to the vehicle 1. In FIG. 5, attention is focused on three of the plurality of sub regions 312, and these are referred to as sub regions 312a to 312c. In each of the sub regions 312a to 312c, information regarding the individual vehicle 1 is displayed. Specifically, information regarding the vehicle 1 whose vehicle ID is "002" is displayed in the sub region 312a, information regarding the vehicle 1 whose vehicle ID is "003" is displayed in the sub region 312b, and information regarding the vehicle 1 whose vehicle ID is "004" is displayed in the sub region 312c.

The information displayed in the sub region 312 includes a vehicle ID, a vehicle speed, a difficulty level, communication quality, and a current position. The "vehicle ID" is an identifier for uniquely identifying the service providing target vehicle 1. The "vehicle speed" is the current speed of the vehicle 1. The "difficulty level" is the current difficulty level of the automated traveling control of the vehicle 1. In one example, the difficulty level is divided in three levels (A is the highest difficulty level), "A", "B", and "C", and displayed. This difficulty level may be a value determined by the vehicle 1 or a value determined by the remote driving device 200 based on information received from the vehicle 1. The "communication quality" is the current quality of communication of the communication device provided in the vehicle 1. Hereinafter, communication of the communication device provided in the vehicle 1 is simply referred to as communication of the vehicle 1. The communication quality is an example of the communication state of the vehicle 1. Instead of or in addition to the communication quality, other information of the communication state may be displayed. The communication quality is divided in three levels (A is the highest communication quality), "A", "B", and "C", and displayed. The "current position" is a current geographical position of the vehicle 1. The current position is indicated by a circle on a map displayed in a region 500, for example. As described above, the remote driving device 200 displays the information including the communication state (the communication quality in the above example) of each of the plurality of vehicles on the display device in association with each vehicle. In addition, the remote driving device 200 displays the information including the communication state of the vehicle on a screen (for example, on a map) that displays a road in association with the geographical position of the vehicle.

As illustrated in sub region 312b, the remote driving device 200 may highlight the communication state in a case where the communication state satisfies a predetermined condition (for example, in the above example, in a case where the communication quality is "C"). In the example of FIG. 5, the communication state is highlighted in a manner in which a character "C" indicating the communication state blinks. The highlighting method is not limited thereto. For example, the communication quality may be displayed in a color different from that in a normal state, or the entire sub region 312 may be highlighted. In addition, the remote driving device 200 divides the communication state in three levels, and highlights the communication state having a predetermined level ("C" in the above example). As the communication state is highlighted in this manner, the operator of the remote driving device 200 can easily determine which vehicle the operator should watch out for.

In the example of FIG. 5, the remote driving device 200 displays the current communication state of the vehicle 1 in association with the vehicle 1. Additionally or alternatively, the remote driving device 200 may display the communication state at a movement destination of the vehicle 1 in association with the vehicle 1.

Figure 6:
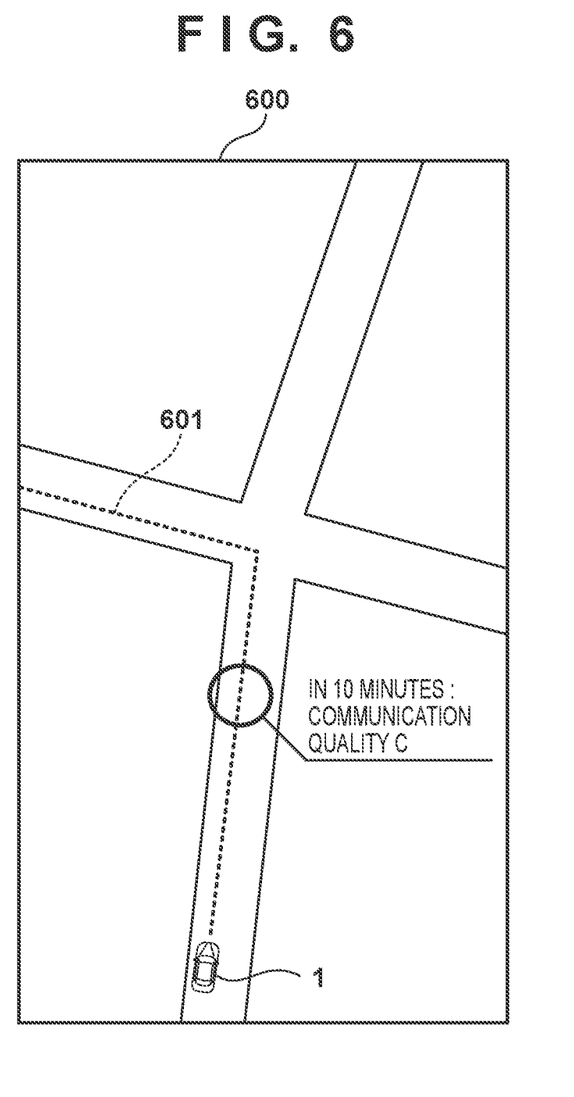
FIG. 6 is a schematic diagram for describing a display example according to the embodiment.

An example in which the communication state at the movement destination of the vehicle 1 is displayed in association with the vehicle 1 will be described with reference to FIG. 6. An image 600 is an image displayed in a main region 311 by the remote driving device 200, for example. The image 600 may be always displayed in the main region 311, or may be displayed in response to an instruction from the operator. As described above, in the main region 311, information regarding the vehicle 1 that is currently under control is displayed. That is, the image 600 is displayed in association with the vehicle 1 that is currently under control. The image 600 may be displayed in each sub region 312.

In the image 600, the current position of the vehicle 1 and the planned movement route 601 of the vehicle 1 are displayed on the map. The planned movement route 601 is received from the vehicle, for example, in S401 of FIG. 4. The image 600 includes the communication state at the movement destination of the vehicle 1. Specifically, the image 600 includes a result of predicting the communication state corresponding to a position where the vehicle 1 is predicted to be positioned after a predetermined time elapses (for example, in 10 minutes). For example, in the example of FIG. 6, the predicted position of the vehicle 1 in 10 minutes is indicated by a circle, and the result of predicting the communication state (communication quality) at the predicted position is "C". In a case where the communication state satisfies the predetermined condition (for example, the communication quality is "C"), the remote driving device 200 may highlight the result of predicting the communication state.

The remote driving device 200 may predict the communication state at the predicted position of the vehicle 1 in 10 minutes based on, for example, a communication state acquired from another communication device currently positioned at this position or information from a wireless base station that provides a communication service at this position. By displaying the communication state at the position of the movement destination (specifically, after the predetermined time elapses) in this manner, the operator of the remote driving device 200 can determine in advance how the communication state changes at the movement destination of the vehicle 1.

Figure 7:
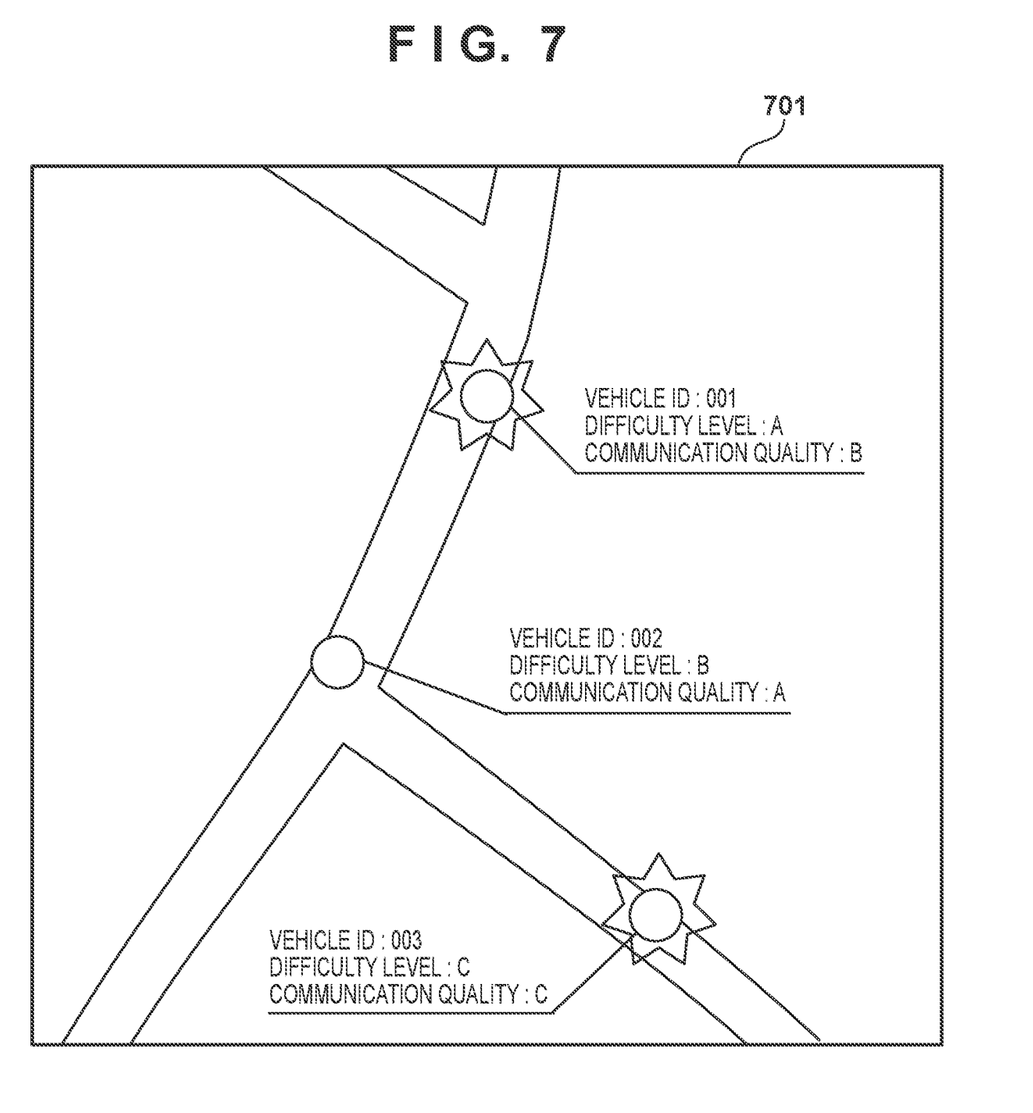
FIG. 7 is a schematic diagram for describing a display example of a screen according to the embodiment.

An image 701 in which position information, the communication state (communication quality in the example), and the difficulty level of each of the plurality of vehicles 1 are collectively displayed in the same display region will be described with reference to FIG. 7. The image 701 may be always displayed on a display device 310, or may be displayed on the display device 310 in response to a request from the user of the remote driving device 200. In addition, the image 701 may be displayed in the main region 311, or may be displayed in a region other than the main region 311 and the sub region 312.

In the image 701, the position of each of the plurality of vehicles is indicated by a circle on the map. In addition, in the image 701, the vehicle ID, the communication quality, and the difficulty level of each vehicle are indicated in association with the position of each vehicle indicated by a circle. Also in this image, a vehicle having a difficulty level higher than a threshold (in the example, a vehicle whose vehicle ID is "001") and a vehicle having a communication quality lower than a threshold (in the example, a vehicle whose vehicle ID is "003") may be highlighted.

In the above-described embodiment, the present disclosure has been described by taking the vehicle 1 as an example. Alternatively, the present disclosure may be applied to a mobile object other than a vehicle. In addition, the communication device provided in a vehicle has been described as an example of the communication device. The communication device whose communication state is displayed may include a communication device that is not provided in a vehicle, for example, an IoT device, a telephone, a mobile computer, or the like. These may be mobile objects or devices used in a state of being fixed to a specific place.

<Summary of Embodiment>
<Configuration 1>
A display control device (200) including:
acquisition means (201 and S401) that acquires a communication state of each of a plurality of communication devices (1); and
control means (201 and S403) that displays the communication state of each of the plurality of communication devices in association with each communication device.

With this configuration, a person other than the user of the communication device can grasp the communication state of the communication device.

<Configuration 2>
The display control device according to Configuration 1, in which the plurality of communication devices include a communication device provided in a mobile object.

With this configuration, the communication state of the communication device of the mobile object can be grasped.

<Configuration 3>
The display control device according to Configuration 2, in which a communication state of the mobile object includes a communication state at a movement destination of the mobile object.

With this configuration, the communication state at the movement destination of the mobile object can be grasped, and thus, it is possible to prepare for a future operation.

<Configuration 4>
The display control device according to Configuration 2 or 3, in which the communication state of the mobile object includes a result of predicting a communication state corresponding to a position of the mobile object after a predetermined time elapses.

With this configuration, the communication state after the predetermined time elapses can be grasped, and thus, it is possible to prepare for a future operation.

<Configuration 5>
The display control device according to any one of Configurations 1 to 4, in which the control means divides the communication state of each of the plurality of communication devices in levels and highlights a communication state having a predetermined level (312b).

With this configuration, the communication state can be more easily grasped.

<Configuration 6>
The display control device according to any one of Configurations 1 to 4, in which the control means highlights a communication state that satisfies a predetermined condition among the communication states of the plurality of communication devices (312b).

With this configuration, the communication state can be more easily grasped.

<Configuration 7>
The display control device according to any one of Configurations 1 to 6, in which the control means displays the communication state of the communication device in association with a position (500) of the communication device.

With this configuration, the communication state can be grasped in accordance with the position.

<Configuration 8>
The display control device according to any one of Configurations 1 to 6, in which the control means displays the communication states of the plurality of communication devices in a same display region (701) in association with positions of the plurality of communication devices.

With this configuration, the position of the communication device and the communication state can be grasped in association with each other.

<Configuration 9>
The display control device according to any one of Configurations 1 to 8,
in which the mobile object is a vehicle,
the acquisition means acquires a difficulty level of an automated traveling control of the vehicle, and
the control means displays the communication state of the communication device provided in the vehicle and the difficulty level of the automated traveling control of the vehicle in association with each other.

With this configuration, the position of the vehicle, the communication state, and the difficulty level can be grasped in association with each other.

<Configuration 10>
The display control device according to any one of Configurations 1 to 9, characterized in that the control means displays the communication state of the mobile object in association with the mobile object on a display device (310) for visual recognition by a user of a remote driving device (200) that provides a remote driving service to the mobile object (1) whose communication state is acquired by the acquisition means.

With this configuration, the user of the remote driving device can grasp the communication state of the mobile object.

<Configuration 11>
A program for causing a computer to function as each means of the display control device according to any one of Configurations 1 to 10.

With this configuration, the above configurations can be implemented in a form of a program.

<Configuration 12>
A display control method including:
an acquisition step (S401) of acquiring a communication state of each of a plurality of communication devices; and
a control step (S403) of displaying the communication state of each of the plurality of communication devices in association with each communication device.

With this configuration, a person other than the user of the communication device can grasp the communication state of the communication device.

The present invention is not limited to the above-described embodiment, and various changes and modifications can be made without departing from the spirit and scope of the present invention. Therefore, in order to make the scope of the present invention public, the following claims are attached.

What is claimed is:

1. A display control device comprising:
   at least one processor circuit and a memory comprising instructions, that when executed by the processor circuit, cause the processor circuit to at least:
   acquire a quality of communication of each of a plurality of communication devices including a communication device in a vehicle and a difficulty level of an automated traveling control of the vehicle; and
   display, on a display device, the quality of communication of each of the plurality of communication devices in association with each communication device, including displaying the quality of communication of the communication device provided in the vehicle and the difficulty level of the automated traveling control of the vehicle in association with each other.

2. The display control device according to claim 1, wherein the plurality of communication devices include a communication device provided in a mobile object.

3. The display control device according to claim 2, wherein a quality of communication of the mobile object includes a quality of communication at a movement destination of the mobile object.

4. The display control device according to claim 2, wherein the quality of communication of the mobile object includes a result of predicting a quality of communication corresponding to a position of the mobile object after a predetermined time elapses.

5. The display control device according to claim 1, wherein the instructions further cause the processor circuit to divide the quality of communication of each of the plurality of communication devices in levels and highlights a quality of communication having a predetermined level.

6. The display control device according to claim 1, wherein the instructions further cause the processor circuit to highlight a quality of communication that satisfies a predetermined condition among the qualities of communication of the plurality of communication devices.

7. The display control device according to claim 1, wherein the instructions further cause the processor circuit to display the quality of communication of the communication device in association with a position of the communication device.

8. The display control device according to claim 1, wherein the instructions further cause the processor circuit to display the qualities of communication of the plurality of communication devices in a same display region in association with positions of the plurality of communication devices.

9. The display control device according to claim 1, wherein the instructions further cause the processor circuit to display the quality of communication of the mobile object in association with the mobile object on a display device for visual recognition by a user of a remote driving device that provides a remote driving service to the mobile object whose quality of communication is acquired.

10. A non-transitory storage medium comprising a program for causing a computer to function as the display control device according to claim 1.

11. A display control method comprising:
    acquiring a quality of communication of each of a plurality of communication devices including a communication device in a vehicle and a difficulty level of an automated traveling control of the vehicle; and
    displaying, on a display device, the quality of communication of each of the plurality of communication devices in association with each communication device, including displaying the quality of communication of the communication device provided in the vehicle and the difficulty level of the automated traveling control of the vehicle in association with each other.

* * * * *